(12) United States Patent
Ogawa et al.

(10) Patent No.: US 8,130,485 B2
(45) Date of Patent: Mar. 6, 2012

(54) CERAMIC ELECTRONIC COMPONENT AND METHOD FOR MANUFACTURING THE SAME

(75) Inventors: Makoto Ogawa, Fukui (JP); Akihiro Motoki, Fukui (JP); Ichiro Nakamura, Kusatsu (JP); Norihiro Yoshikawa, Koka (JP); Toshiyuki Iwanaga, Sabae (JP); Kenichi Kawasaki, Echizen (JP); Shunsuke Takeuchi, Echizen (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 519 days.

(21) Appl. No.: 12/356,561

(22) Filed: Jan. 21, 2009

(65) Prior Publication Data

US 2009/0268372 A1 Oct. 29, 2009

(30) Foreign Application Priority Data

Apr. 28, 2008 (JP) .................... 2008-116634

(51) Int. Cl.
*H01G 4/228* (2006.01)
*C25D 15/00* (2006.01)
(52) U.S. Cl. .............. 361/309; 361/311; 205/109
(58) Field of Classification Search ........ 361/306.1, 361/306.3, 309, 311; 29/25.03
See application file for complete search history.

(56) References Cited

U.S. PATENT DOCUMENTS

| | | |
|---|---|---|
| 6,960,366 B2 | 11/2005 | Ritter et al. |
| 6,972,942 B2 | 12/2005 | Ritter et al. |
| 6,982,863 B2 * | 1/2006 | Galvagni et al. ............. 361/309 |
| 7,067,172 B2 | 6/2006 | Ritter et al. |
| 7,152,291 B2 | 12/2006 | Ritter et al. |
| 7,154,374 B2 | 12/2006 | Ritter et al. |
| 7,161,794 B2 | 1/2007 | Galvagni et al. |
| 7,177,137 B2 | 2/2007 | Ritter et al. |
| 7,344,981 B2 | 3/2008 | Ritter et al. |
| 7,345,868 B2 | 3/2008 | Trinh |
| 7,463,474 B2 | 12/2008 | Ritter et al. |
| 2005/0046536 A1 | 3/2005 | Ritter et al. |
| 2007/0014075 A1 | 1/2007 | Ritter et al. |
| 2008/0123248 A1 | 5/2008 | Kunishi et al. |
| 2008/0123249 A1 | 5/2008 | Kunishi et al. |
| 2008/0158774 A1 | 7/2008 | Trinh |
| 2009/0249833 A1 * | 10/2009 | Yamaguchi et al. ......... 65/21.3 |

FOREIGN PATENT DOCUMENTS

CN 101150009 A 3/2008

(Continued)

OTHER PUBLICATIONS

Iwanaga et al.; "Monolithic Ceramic Electronic Component and Method of Manufacturing the Same"; U.S. Appl. No. 12/405,370, filed Mar. 17, 2009.

(Continued)

*Primary Examiner* — Eric Thomas
(74) *Attorney, Agent, or Firm* — Keating & Bennett, LLP

(57) ABSTRACT

When external electrodes of a multilayer ceramic capacitor are formed by performing direct plating on surfaces at which internal electrodes are exposed without forming paste electrode layers, bonding forces of plating layers are relatively weak, and in addition, when glass particles are included in the plating layers, blisters are often generated. To overcome these problems, a multilayer ceramic capacitor is formed by performing electrolytic plating using a plating bath including glass particles, electrolytic plating layers including glass particles dispersed therein are formed as the external electrodes.

7 Claims, 3 Drawing Sheets

FOREIGN PATENT DOCUMENTS

| | | |
|---|---|---|
| JP | 63-169014 A | 7/1988 |
| JP | 05-343259 A | 12/1993 |
| JP | 2004146401 A * | 5/2004 |
| WO | WO 2007020855 A1 * | 2/2007 |

OTHER PUBLICATIONS

Iwanaga et al.; "Multilayer Ceramic Electronic Component and Method for Producing Same"; U.S. Appl. No. 12/405,372, filed Mar. 17, 2009.

Ogawa et al.; "Monolithic Ceramic Electronic Component and Method of Manufacturing Monolithic Ceramic Electronic Component"; U.S. Appl. No. 12/405,405, filed Mar. 17, 2009.

Ogawa et al.; "Ceramic Electronic Component and Method for Manfacturing the Same"; U.S. Appl. No. 12/405,399, filed Mar. 17, 2009.

Official Communication issued in corresponding Chinese Patent Application No. 200910001895.X, issued on Feb. 28, 2011.

* cited by examiner

CERAMIC ELECTRONIC COMPONENT AND METHOD FOR MANUFACTURING THE SAME

BACKGROUND OF THE INVENTION

1. Field of the Invention

The present invention relates to a ceramic electronic component and a method for manufacturing the same, and more particularly, to external electrodes of a ceramic electronic component and a method for forming the external electrodes by an electrolytic plating method.

2. Description of the Related Art

A related multilayer ceramic capacitor includes a laminate which includes dielectric ceramic layers laminated to each other and layered internal electrodes provided along interfaces therebetween and external electrodes provided on the laminate so as to electrically connect the internal electrodes which are exposed on surfaces of the laminate. An example of this related multilayer ceramic capacitor is shown in FIG. 3.

As shown in FIG. 3, external electrodes are provided on surfaces of a laminate 102 at which internal electrodes 104 and internal electrodes 105 are exposed so as to electrically connect the respective internal electrodes 104 and 105. In a typical method for forming external electrodes, a metal paste including a metal component and a glass component is applied to the surfaces at which the internal electrodes are exposed and is then fired by a heat treatment, such that paste electrode layers 106 and 107 are formed.

Subsequently, first plating layers 108 and 109 primarily including Ni are formed on surfaces of the paste electrode layers 106 and 107, respectively, and second plating layers 110 and 111 primarily including Sn are formed on surfaces of the first plating layers 108 and 109, respectively. That is, the external electrodes each have a three-layer structure including the paste electrode layer, the first plating layer, and the second plating layer.

The external electrodes are required to have high wettability to solder when a multilayer ceramic capacitor is mounted on a substrate using solder. At the same time, the external electrodes must function to electrically connect the internal electrodes which are electrically insulated from each other. The second plating layers 110 and 111 primarily including Sn ensure the solder wettability, and the paste electrode layers 106 and 107 electrically connect the internal electrodes. The first plating layers 108 and 109 function as underlying layers for the second plating layers 110 and 111, respectively, in order to prevent solder leaching during solder mounting.

However, each of the paste electrode layers 106 and 107 has a relatively large thickness of approximately several tens to several hundreds of micrometers. Thus, when this multilayer ceramic capacitor is formed so that the dimensions thereof conform to a predetermined standard value, an effective volume to ensure electrostatic capacitance must be decreased in an amount corresponding to the volume required to form the paste electrode layers. On the other hand, since the plating layers each have a thickness of approximately several micrometers, if the external electrodes can be formed only from the first and the second plating layers, a greater effective volume can be ensured.

For example, a method is disclosed in Japanese Unexamined Patent Application Publication No. 63-169014 in which conductive metal layers are deposited by electroless plating over substantially the entire side wall surfaces of a laminate at which internal electrodes are exposed so as to short-circuit the respective internal electrodes exposed at the side wall surfaces. However, with this method, a bonding force of the conductive metal layer formed by electroless plating to the side wall surface is weak, and reduced reliability may occur.

In addition, in Japanese Unexamined Patent Application Publication No. 5-343259, a technique is disclosed in which external electrodes having superior adhesion are formed by forming electroless plating films including glass powder dispersed therein on bare ceramic surfaces.

However, with the method for forming external electrodes disclosed in Japanese Unexamined Patent Application Publication No. 5-343259, since the plating method is electroless plating, depending on subsequent heat treatment conditions, blisters are likely to be generated in the electroless plating film. When blisters are generated, moisture may enter therethrough, and problems, such as degradation in reliability, may arise.

Furthermore, with the above-described method for forming external electrodes, since the plating method is electroless plating, if it is attempted to co-deposit glass powder together with metal ions, there is a problem in that the glass is dissolved or is not sufficiently deposited.

SUMMARY OF THE INVENTION

To overcome the problems described above, preferred embodiments of the present invention provide a ceramic electronic component having a high effective volume and superior reliability by forming external electrodes thereof only from plating films including glass particles, and a method for manufacturing the ceramic electronic component.

A ceramic electronic component according to a preferred embodiment of the present invention includes a ceramic base body, and external electrodes provided on surfaces of the ceramic base body, and the external electrodes include electrolytic plating films including glass particles dispersed therein.

In addition, the ceramic base body may preferably be a laminate including ceramic layers laminated to each other and internal electrodes provided along interfaces between the ceramic layers, and the electrolytic plating films including glass particles dispersed therein may be arranged so as to electrically connect the internal electrodes exposed at surfaces of the laminate.

In addition, the external electrodes may preferably further include plating films on the electrolytic plating films including glass particles dispersed therein.

A method for manufacturing a ceramic electronic component according to another preferred embodiment of the present invention includes the steps of preparing a ceramic base body and a plating bath, and performing electrolytic plating on the ceramic base body using the plating bath to form electrolytic plating films including glass particles dispersed therein, and the plating bath includes metal ions or metal complexes and glass particles.

The ceramic base body may preferably be a laminate including ceramic layers laminated to each other and internal electrodes arranged along interfaces between the ceramic layers, and the electrolytic plating films including glass particles dispersed therein may preferably be arranged so as to electrically connect between the internal electrodes exposed at surfaces of the laminate.

Furthermore, the method for manufacturing a ceramic electronic component described above preferably further includes the step of, after the step of forming electrolytic plating films containing glass particles dispersed therein, performing a heat treatment at a temperature substantially equal to or greater than a softening point of the glass.

The glass particles included in the plating bath are preferably coated with a silane coupling agent.

According to preferred embodiments of the present invention, since the external electrodes are formed substantially only from the plating films, a ceramic electronic component having a high effective volume can be obtained. In addition, since the plating film is an electrolytic plating film including glass particles dispersed therein, a ceramic electronic component having a high bonding force, a small number of blisters, and superior reliability can be obtained.

In addition, when the surfaces on which the plating films are formed are surfaces at which the internal electrodes are exposed, since spaces between the ceramic layers and the internal electrodes are filled with glass particles, moisture is prevented from entering through the interfaces between the ceramic layers and the internal electrodes. Thus, a multilayer ceramic electronic component having superior reliability can be obtained.

In addition, in the method for manufacturing a ceramic electronic component according to preferred embodiments of the present invention, since the plating method is an electrolytic plating method, and a reducing agent is not necessarily used, a complicated step of performing a catalytic treatment on an underlying layer can be omitted. Furthermore, since glass particles are not likely to be dissolved in an electrolytic plating solution as compared to an electroless plating solution, the glass particles can be stably dispersed in the plating film.

In addition, in the method for manufacturing a ceramic electronic component according to preferred embodiments of the present invention, by performing a heat treatment at a temperature substantially equal to or greater than a glass softening point after the plating step, a bonding force between the glass component and the ceramic base body can be further increased, and thus, a ceramic electronic component having superior reliability can be obtained.

Furthermore, in the method for manufacturing a ceramic electronic component according to preferred embodiments of the present invention, when the glass particles included in the plating bath are coated with a silane coupling agent, the glass particles are electrified and can be efficiently co-deposited during the electrolytic plating. Thus, the content and the degree of dispersion of the glass particles included in the plating film can be easily controlled.

Other features, elements, characteristics and advantages of the present invention will become more apparent from the following detailed description of preferred embodiments of the present invention with reference to the attached drawings.

DETAILED DESCRIPTION OF PREFERRED EMBODIMENTS

In a ceramic electronic component according to preferred embodiments of the present invention, when external electrodes are formed, plating films must be directly formed on a ceramic base body without using paste electrodes, sputtering electrodes, deposition electrodes, and other types of electrodes. In addition, the plating films are electrolytic plating films each including glass particles dispersed therein. As the ceramic electronic component according to preferred embodiments of the present invention, a multilayer ceramic capacitor is shown in FIG. 1 as an example.

Figure 1:
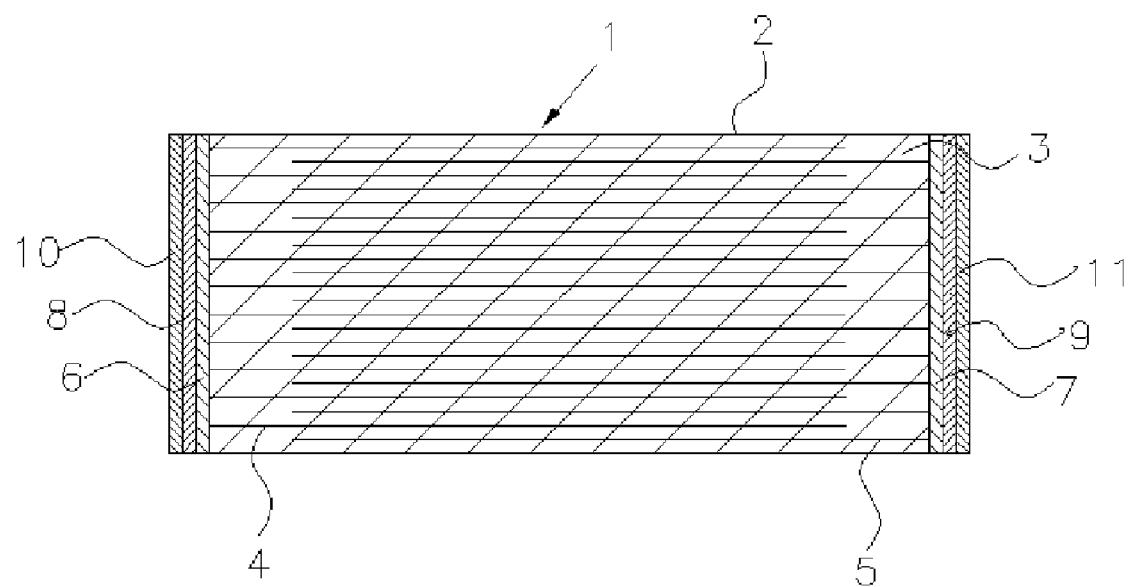
FIG. 1 is a cross-sectional view of a multilayer ceramic capacitor which is one example of a ceramic electronic component according to a preferred embodiment of the present invention.

According to FIG. 1, a multilayer ceramic capacitor 1 includes a laminate 2 including dielectric ceramic layers 3 laminated to each other, internal electrodes 4 and 5 provided along interfaces between the dielectric ceramic layers, and external electrodes arranged so as to electrically connect the internal electrodes 4 exposed on one surface of the laminate 2 and between the internal electrodes 5 exposed on another surface thereof. For the formation of the external electrodes, first plating layers 6 and 7, which are electrolytic plating films including glass particles dispersed therein, are first formed on respective surfaces of the laminate 2 at which the internal electrodes 4 and 5 are exposed, second plating layers 8 and 9 each functioning as a solder leaching resistant layer are formed on the first plating layers 6 and 7, respectively, and third plating layers 10 and 11 which ensure solder wettability are formed on the respective second plating layers 8 and 9. In the second plating layers 8 and 9 and the third plating layers 10 and 11, glass particles are not necessarily dispersed. In addition, in FIG. 1, the glass particles dispersed in the first plating layers 6 and 7 are not shown.

The external electrodes shown in FIG. 1 each preferably have a three-layer structure including the first plating layer 6 or 7, the second plating layer 8 or 9, and the third plating layer 10 or 11. However, as long as the advantages of various preferred embodiments of the present invention can be achieved, the three-layer structure is not necessarily provided.

Since the third plating layers 10 and 11 shown in FIG. 1 are required to have superior wettability to solder, Sn, Au, or another suitable material, for example, is preferably used as a primary component thereof. In addition, since the second plating layers 8 and 9 are required to have an underlying-layer function to prevent solder leaching, for example, Ni is preferably used as a primary component thereof. In addition, although a primary component of the first plating layer is not particularly limited, when the affinity of the primary component onto the ceramic base body is important, for example, Cu is preferably used. Furthermore, the first plating layer and the second plating layer may preferably be replaced with a single Ni plating layer including glass particles dispersed therein, for example.

In addition, the first plating layer is not formed by electroless plating in which metal ions are deposited using a reducing agent, and instead, is formed by electrolytic plating performed by a current application treatment. Thus, a surface to be plated must at least have a conductive component thereon, and in this case, a method for using exposed ends of internal electrodes as the conductive component is preferably used. In addition, as another conductive component, for example, fine metal particles which are adhered beforehand may preferably be used.

Figure 2:
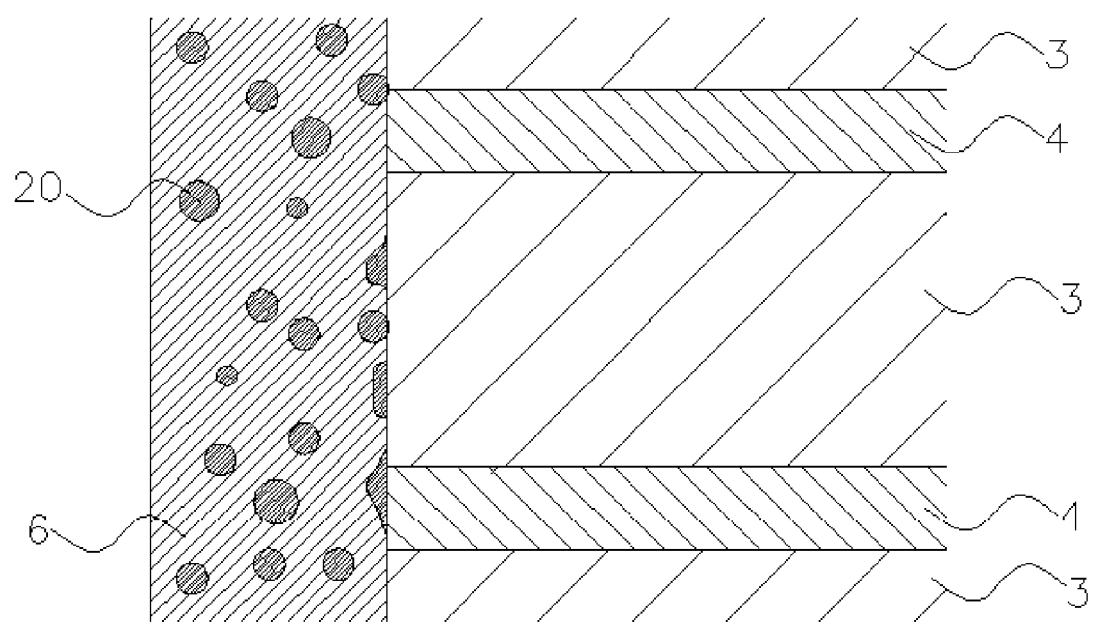
FIG. 2 is an enlarged view of a first plating layer shown in FIG. 1.
Figure 3:
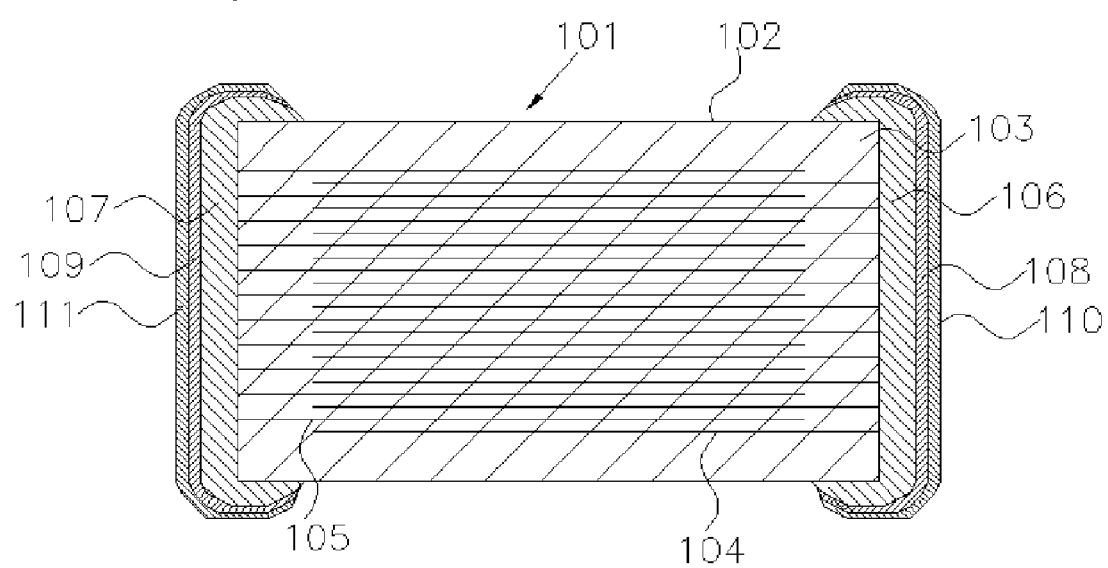
FIG. 3 is a cross-sectional view of a related multilayer ceramic capacitor.

Next, FIG. 2 is an enlarged view showing a portion in which the first plating layer 6 is formed on exposed surfaces of the internal electrodes of the laminate 2. In FIG. 2, the second plating layer 8 and the third plating layer 10 are not shown.

As shown in FIG. 2, glass particles 20 are dispersed in the first plating layer 6. Since at least some of the glass particles 20 adhere to the dielectric ceramic layers 3, a bonding force of the first plating layer 6 is increased. Furthermore, when the glass particles 20 are filled between the interfaces of the dielectric ceramic layers 3 and the internal electrodes 4, the intrusion of moisture, such as a plating solution, can be effectively prevented. Although the possible types of glass particles described above are not particularly limited, for example, a B—Si-based glass may preferably be used. More particularly, for example, a B—Si—Bi-based, a B—Si-alkali metal-based, a B—Si-alkali metal-(Ti, Zr)-based, a B—Si-alkaline earth metal-based, a B—Si-alkali metal-alkaline earth metal-based, a B—Si—Zn-alkali metal-based, and a B—Si-Zn-alkaline earth metal-based glass may preferably be used. In addition, the size of glass particles is preferably in the range of about 0.01 µm to about 7 µm, for example, depending upon co-deposition amount and bonding properties during heat treatment, and the content of the glass particles in the first plating layer 6 is preferably in the range of about 0.1 to about 20 percent by volume, for example.

Next, a method for manufacturing the ceramic electronic component according to a preferred embodiment of the present invention will be described with reference to the multilayer ceramic capacitor shown in FIG. 1 as an example.

In the laminate 2 before being processed by plating, the exposed internal electrodes 4 are electrically insulated from each other. First, electrolytic plating is performed, so that metal ions in a plating solution are deposited on exposed portions of the internal electrodes 4. Subsequently, plating deposits that are formed are further grown, so that the plating deposits on the exposed portions of adjacent internal electrodes 4 are connected to each other. The deposits are further grown over substantially the entire surface at which the internal electrodes 4 are exposed, so that the first plating layer 6 having uniform and dense properties is formed directly on the surface at which the internal electrodes 4 are exposed.

The method according to preferred embodiments of the present invention may be regarded as a method using the high growing and spreading ability of plating deposits. With electrolytic plating, the dielectric ceramic layer 3 preferably has a thickness of approximately 10 µm or less, for example, to facilitate the grown plating deposits being connected to each other.

In addition, before the plating is performed, a withdrawal length of each internal electrode from the surface of the laminate at which the internal electrode 4 is exposed is preferably approximately 1 µm or less, for example. The reason for this is that when the withdrawal length is greater than approximately 1 µm, electrons are not easily supplied to the exposed portions of the internal electrodes 4, and that plating deposits are not likely to be generated. In order to decrease the withdrawal length described above, polishing, such as sand blasting or barrel polishing, for example, may preferably be performed.

Furthermore, before the plating is performed, end portions of the internal electrodes preferably protrude from the surfaces at which the internal electrodes 4 are exposed. This may be achieved when polishing conditions of sand blasting or other suitable polishing methods are appropriately adjusted, and since portions of the internal electrodes 4 which protrude during this polishing extend in directions substantially parallel to the surfaces to be plated, the degree of plating growth necessary to connect between plating deposits formed on the end portions of adjacent internal electrodes may be reduced. In this case, the thickness of the dielectric ceramic layer is preferably approximately 20 µm or less, for example, since the grown plating deposits described above are more likely to be connected to each other.

In addition, when the first plating layers 6 and 7 are formed, the second plating layers 8 and 9 and the third plating layers 10 and 11 can be easily formed by common electrolytic plating.

Next, details of an electrolytic plating method will be described.

With electrolytic plating, for example, a method may be performed in which the laminate which is not provided with the external electrodes and a conductive medium are disposed in a container provided with electrical supply terminals and are immersed in a plating bath including metal ions or metal complexes, and electricity is then supplied to the plating bath while the container is rotated, swung, or vibrated.

In this method, if glass particles are dispersed in the plating bath, when the metal is deposited by applying electricity, the glass particles are also simultaneously deposited. In order to disperse glass particles in a plating bath, a method for appropriately stirring a plating bath may be used, for example. The concentration of the glass particles in the plating bath is preferably in the range of about 0.5 g/liter to about 50 g/liter, for example.

Furthermore, before the glass particles are dispersed in the plating bath, the glass particles are preferably coated with a silane coupling agent in advance. In this case, a deposition efficiency of the glass particles is increased, and a larger number of glass particles are co-deposited in the plating film. Thus, the content of the glass particles in the plating film can be easily controlled, and the degree of dispersion of the glass particles can also be improved. The reason for this is believed to be that since being coated with a silane coupling agent, the glass particles are positively electrified.

In addition, since being coated with a silane coupling agent, the glass particles are not likely to be dissolved in the plating bath, and as a result, the deposition behavior of the glass particles is stabilized.

When a heat treatment is performed on the laminate 2 at a temperature substantially equal to or greater than a softening point of the glass particles after the electrolytic plating films including the glass particles are formed, the glass particles in the plating films flow to the laminate side and adhere thereto, so that the bonding forces of the first plating layers 6 and 7 to the laminate are improved.

When the heat treatment described above is performed, for an electroless plating film including glass particles dispersed therein, blisters are likely to be generated. However, with the electrolytic plating film of various preferred embodiments of the present invention, even when glass particles are dispersed, and a heat treatment is performed, blisters are very unlikely to be generated.

When the ceramic electronic component according to a preferred embodiment of the present invention is the multilayer ceramic capacitor shown in FIG. 1, the external electrodes thereof are preferably formed substantially only from the plating layers. However, paste electrodes may be provided at portions which are not directly relating to the connection between the internal electrodes. For example, when it is desired to extend the external electrode to a surface adjacent to the end surface at which the internal electrodes are exposed, a thick paste electrode may be formed on the surface described above. In this case, solder mounting can be easily performed, and in addition, moisture is effectively prevented from entering from the end portion of the plating layer.

As the ceramic electronic component according to preferred embodiments of the present invention, a multilayer ceramic capacitor is disclosed as an example. However, preferred embodiments of the present invention may also be applied to a multilayer chip inductor, a multilayer chip thermistor, and other suitable multilayer electronic components. That is, when the ceramic layers are electrically insulated from each other, a material therefor is not particularly limited. For example, instead of a dielectric ceramic, a piezoelectric ceramic, a semiconductor ceramic, and a magnetic ceramic, for example, may also preferably be used, and a ceramic including a resin may also preferably be used. In addition, preferred embodiments of the present invention may also be applied to a simple ceramic electronic component including no internal electrodes.

Furthermore, in the multilayer ceramic capacitor shown in FIG. 1, although one pair of external electrodes is provided, preferred embodiments of the present invention may also be applied to an array type electronic component having at least two pairs of external electrodes.

Hereinafter, examples of the ceramic electronic component according to preferred embodiments of the present invention and the manufacturing method thereof will be described.

Example 1

A laminate for a multilayer ceramic capacitor having a length of about 1.0 mm, a width of about 0.5 mm, and a thickness of about 0.5 mm was prepared. Dielectric layers were each formed from a barium titanate-based dielectric material, and internal electrodes were primarily formed of Ni. In addition, the thickness of the dielectric layer provided between adjacent internal electrodes was about 2 μm, and the thickness of the internal electrode was about 1 μm.

After the laminate was dried, a sand blasting treatment was performed using a polishing agent, so that an average protrusion length of the internal electrodes protruding from the surface of the laminate at which the internal electrodes were exposed was set to about 1 μm.

Next, a B—Si glass powder having a softening point of about 600° C. and an average particle diameter of about 1.1 μm was prepared. This glass powder was coated with an amino-based silane coupling agent.

The coated glass powder was added to a pyrophosphoric acid-based electrolytic plating bath including PYRO-SOL manufactured by Meltex Inc. to obtain a concentration of about 10 g/l and was dispersed therein by stirring at a bath temperature of about 58° C. and a pH of about 8.7.

Next, about 30 ml of the laminates were disposed in a rotary barrel having a volume of about 300 ml, and about 70 ml of solder balls having a diameter of about 0.7 mm were also disposed therein.

The rotary barrel was immersed in the plating solution, and a current of about 10 A was supplied while the rotary barrel is rotated at a speed of about 20 rpm. After about 180 minutes from the beginning of the current supply, Cu plating layers having a thickness of about 5 μm and including glass particles dispersed therein were formed on the surfaces of the laminate at which the internal electrodes were exposed.

Next, the laminates were recovered from the rotary barrel, were heated to about 700° C. at a temperature rising rate of about 5° C./minute in a nitrogen atmosphere, and were maintained for about 10 minutes.

After the laminates provided with the Cu plating films were again disposed in the rotary barrel, and the rotary barrel was immersed in a Ni plating watt bath having an adjusted pH of about 4.2 and a bath temperature of about 60° C., a current of about 10 A was supplied while the rotary barrel was rotated at a speed of about 20 rpm. After 120 minutes from the beginning of the current supply, Ni plating layers each having a thickness of about 3.0 μm were formed on the Cu plating layers.

Furthermore, after the rotary barrel receiving the laminates provided with the Ni plating films was immersed in an Sn plating bath (Sn-235 manufactured by Dipsol Chemical Co., Ltd.) having an adjusted pH of about 5.0 and a bath temperature of about 33° C., a current of about 6 A was supplied while the rotary barrel was rated at a speed of about 20 rpm. After about 60 minutes from the beginning of the current supply, Sn plating layers each having a thickness of about 3.0 μm were formed on the Ni plating layers.

With the steps described above, a multilayer ceramic capacitor provided with external electrodes made of the plating layers was obtained without forming paste electrode layers on the laminate.

When 100 samples of the multilayer ceramic capacitors were selected for evaluation, and the surfaces of the external electrodes thereof were observed by an optical microscope, no blisters were observed on these 100 samples.

In addition, after the multilayer ceramic capacitor was solder-mounted on an epoxy substrate, a stress was applied to the central portion of the side surface of multilayer ceramic capacitor, which corresponds to the plane of FIG. 1, in a direction substantially parallel to the substrate, that is, in a direction substantially perpendicular to the plane of the figure, and a stress at which the external electrode was peeled off was regarded as the bonding force. When the average value was calculated from 10 bonding forces, a sufficient value of about 80 N was obtained.

Comparative Example 1

The same laminate and glass particles as those of Example 1 were prepared. The glass particles were coated with a silane coupling agent by a method similar to that of Example 1.

The glass particles thus coated were added to an electroless Cu plating bath including OPC Copper T manufactured by Okuno Chemical Industries Co., Ltd. so as to have a concentration of about 30 g/l and were dispersed therein by stirring at a bath temperature of about 40° C. and a pH of about 12.

Next, about 30 ml of the laminates were disposed in a rotary barrel having a volume of about 300 ml, and about 70 ml of Ni balls having a diameter of about 0.7 mm were also disposed therein.

When the rotary barrel was immersed in the plating solution and was rotated at a speed of about 12 rpm, Cu plating layers each having a thickness of about 5 μm and including glass particles dispersed therein were formed on the surfaces of the laminate at which the internal electrodes were exposed.

Next, the laminates were recovered from the rotary barrel, were heated to about 700° C. at a temperature rising rate of about 5° C./minute in a nitrogen atmosphere, and were maintained for about 10 minutes.

As described above, the laminate provided with the Cu plating films was processed by methods similar to those of Example 1, so that Ni plating layers and Sn plating layers were formed. With the steps described above, a multilayer ceramic capacitor provided with external electrodes made of the plating layers was obtained.

When 100 samples of the multilayer ceramic capacitors were selected for evaluation, and the surfaces of the external electrodes thereof were observed by an optical microscope, blisters were observed on all of the samples.

In addition, when the bonding force of the external electrode was evaluated by the same method as that of Example 1, the average value calculated from 10 bonding forces was about 60 N.

Comparative Example 2

Substantially the same laminate as that of Example 1 was prepared.

Cu plating layers were formed on the laminate by a method similar to that of Example 1 except that no glass particles were added to the plating bath.

After a heat treatment was performed for the laminate provided with the Cu plating layers under substantially the same conditions as those of Example 1, Ni plating and Sn plating were formed by methods similar to those of Example 1. With the steps as described above, a multilayer ceramic capacitor provided with external electrodes made of the plating layers was obtained.

When 100 samples of the multilayer ceramic capacitors were selected for evaluation, and the surfaces of the external electrodes were observed by an optical microscope, no blisters were observed on any of the samples.

In addition, when the bonding force of the external electrode was evaluated by the same method as that of Example 1, the average value calculated from 10 bonding forces was insufficient, such as about 40 N.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A ceramic electronic component comprising:
   a ceramic base body; and
   external electrodes provided on surfaces of the ceramic base body; wherein
   the external electrodes include electrolytic plating films including glass particles dispersed therein.

2. The ceramic electronic component according to claim 1, wherein
   the ceramic base body is a laminate including ceramic layers laminated to each other and internal electrodes arranged along interfaces between the ceramic layers; and
   the electrolytic plating films including glass particles dispersed therein are arranged so as to electrically connect the internal electrodes exposed at surfaces of the laminate.

3. The ceramic electronic component according to claim 1, wherein the external electrodes further include plating films disposed on the electrolytic plating films including glass particles dispersed therein.

4. A method for manufacturing a ceramic electronic component comprising the steps of:
   preparing a ceramic base body and a plating bath; and
   performing electrolytic plating on the ceramic base body using the plating bath to form electrolytic plating films including glass particles dispersed therein; wherein
   the plating bath includes metal ions or metal complexes and glass particles.

5. The method for manufacturing a ceramic electronic component according to claim 4, wherein
   the ceramic base body is a laminate including ceramic layers laminated to each other and internal electrodes formed along interfaces between the ceramic layers; and
   the electrolytic plating films including glass particles dispersed therein are formed so as to electrically connect the internal electrodes exposed at surfaces of the laminate.

6. The method for manufacturing a ceramic electronic component according to claim 4, further comprising the step of:
   after the step of forming electrolytic plating films including glass particles dispersed therein, performing a heat treatment at a temperature substantially equal to or greater than a softening point of the glass particles.

7. The method for manufacturing a ceramic electronic component according to claim 4, wherein the glass particles included in the plating bath are coated with a silane coupling agent.

* * * * *